United States Patent
Tanjo et al.

(10) Patent No.: US 7,138,208 B2
(45) Date of Patent: Nov. 21, 2006

(54) RECHARGEABLE LITHIUM ION BATTERY

(75) Inventors: Yuuji Tanjo, Kanagawa-ken (JP);
Yasuhiko Ohsawa, Kanagawa-ken (JP);
Hideaki Horie, Kanagawa-ken (JP);
Tatsuhiro Fukuzawa, Kanagawa-ken (JP);
Mikio Kawai, Kanagawa-ken (JP);
Tomaru Ogawa, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 443 days.

(21) Appl. No.: 09/939,711

(22) Filed: Aug. 28, 2001

(65) Prior Publication Data
US 2002/0028380 A1  Mar. 7, 2002

(30) Foreign Application Priority Data
Aug. 28, 2000 (JP) ............... 2000-257766

(51) Int. Cl.
*H01M 2/16* (2006.01)
*H01M 2/18* (2006.01)

(52) U.S. Cl. .............. 429/145; 429/142; 429/144
(58) Field of Classification Search ........ 429/142, 429/144, 145
See application file for complete search history.

(56) References Cited
U.S. PATENT DOCUMENTS

| | | | |
|---|---|---|---|
| 3,423,247 A * | 1/1969 | Johannes et al. ......... | 429/40 |
| 4,444,852 A * | 4/1984 | Liu et al. ................ | 429/29 |
| 5,900,336 A | 5/1999 | Kabata et al. | |
| 6,046,268 A * | 4/2000 | Ochoa et al. ............ | 524/495 |
| 6,051,343 A | 4/2000 | Suzuki et al. | |
| 6,159,636 A * | 12/2000 | Wang et al. ............. | 429/223 |
| 6,432,585 B1 * | 8/2002 | Kawakami et al. ....... | 429/233 |

FOREIGN PATENT DOCUMENTS

| | | | |
|---|---|---|---|
| JP | 11-31498 | * | 2/1996 |
| JP | 11-31498 | | 2/1999 |
| JP | 11-297354 | | 10/1999 |
| JP | 11-329409 | | 11/1999 |

* cited by examiner

*Primary Examiner*—Patrick Joseph Ryan
*Assistant Examiner*—Julian Mercado
(74) *Attorney, Agent, or Firm*—McDermott Will & Emery LLP

(57) ABSTRACT

A rechargeable lithium ion battery with high power density comprises a positive electrode; a negative electrode; and a non-aqueous electrolytic solution, in which the positive electrode includes a active material layer containing a positive electrode active material with the particle diameter of 5 μm or less and having the thickness at a range of 20 to 80 μm. Another rechargeable lithium ion battery with high power density comprises a positive electrode; a negative electrode; and a non-aqueous electrolytic solution, in which the positive electrode has two active material layers, each of which contains a positive electrode active material with a different diameter and has the thickness at a range of 20 to 30 μm.

16 Claims, 9 Drawing Sheets

RECHARGEABLE LITHIUM ION BATTERY

BACKGROUND OF THE INVENTION

1. Field of the Invention

The present invention relates to a rechargeable lithium ion battery and more specifically, to a rechargeable lithium ion battery in which power density is increased.

2. Description of the Related Art

Research of various secondary batteries, which can be used for a long period of time and rechargeable as a power source of various electronic devices and electric apparatuses, has been made. Among others, active research and development have been made for a rechargeable lithium ion battery having characteristics such that higher energy density and higher power density can be realized in comparison with secondary batteries commercially available such as nickel-cadmium storage batteries and nickel-hydrogen storage batteries. The rechargeable lithium ion battery is commercialized as a power source of portable electric devices such as a cellular phone, a camcorder and a laptop personal computer.

In addition, interest in an electric vehicle and a hybrid vehicle has been increasing so as to solve the problems of environmental pollution of the earth and greenhouse effect of the earth. Application of the rechargeable lithium ion battery as a power source of such vehicles has been expected.

In applying the rechargeable lithium ion battery to vehicles and the like, the battery is used as a battery module in which a plurality of the batteries are connected in series to obtain high power density. The battery module also has advantages of easy control and high stability.

The rechargeable lithium ion battery has important characteristics such as energy density (i.e. energy per unit weight or energy per unit volume), power density (i.e. power per unit weight or power per unit volume) and cycle characteristic. Japanese Laid-Open Patent Publications H11-31498 (published in 1999), H11-297354 (published in 1999) and H11-329409 (published in 1999) disclose technologies for improving the characteristics.

SUMMARY OF THE INVENTION

The Japanese Laid-Open Patent Publications H11-31498 discloses a method for improving capacity and cycle characteristic of batteries by adjusting the specific surface area of electrode active materials and the porosity of the electrode active material layer. However, although the relation between the specific surface area and the porosity of the electrode active material layer is considered, sufficient consideration is not given for the relative operation of the particle diameter of the electrode active materials, the electrode thickness and the porosity. Accordingly, sufficient power density cannot be obtained depending on the conditions of the electrode thickness and the particle diameter, and improvement of the rechargeable battery performance is limited only by the adjustment of the specific surface area and the porosity of the electrode active material.

Although the Japanese Laid-Open Patent Publication H11-297354 discloses a method for defining the concentration of electrolyte, it does not describe the correlation between the particle diameter of the active material or the electrode thickness and the concentration of the electrolyte. Accordingly, the power density cannot be effectively increased even if the concentration of the electrolyte is increased depending on the conditions of the particle diameter of the active material and the electrode thickness because the lithium ion conductivity of electrolytic solution is reduced.

In addition, the Japanese Laid-Open Patent Publication H11-329409 discloses a method for improving the power density of the rechargeable lithium ion battery by defining the coating thickness of the electrode active material and the particle diameter of the active material. However, according to this method, there is a case where the energy density is reduced although the power density is increased.

If the lithium rechargeable battery is used for an electric vehicle or a hybrid vehicle, high energy density is important to increase driving range and improved power density is also important to obtain a good acceleration.

The object of the present invention is to provide a rechargeable lithium ion battery which is capable of being used as an energy source for a vehicle and improving the power density without reducing the energy density.

To achieve the object, a first aspect of the present invention provides a rechargeable lithium ion battery which comprises a positive electrode; a negative electrode; and non-aqueous electrolytic solution, in which the positive electrode comprises an active material layer containing a positive electrode active material with the particle diameter of 5 μm or less and having the thickness at a range of 20 to 80 μm. Also porosity of the active material layer is 50% or more.

According to the first aspect of the present invention, since the particle diameter of the positive electrode active material is 5 μm or less, the migration speed of lithium ion is not determined by diffusion of lithium ion in the positive electrode active material. Moreover, since the thickness of the active material layer is set at a range of 20 to 80 μm, shortage of the amount of the positive electrode active material in the thickness direction can be prevented within a range where the power density can be maintained. Also since the porosity of the active material layer is 50%, there is enough electrolyte solution in the active material layer to prevent a decrease in the power density. As a result, the power density can be increased without reducing the energy density.

Further, a second aspect of the present invention provides a rechargeable lithium ion battery which comprises a positive electrode; a negative electrode; and a non-aqueous electrolytic solution, in which the positive electrode has two active material layers, each of which contains a positive electrode active material with a different diameter and has a thickness at a range of 20 to 30 μm inclusively.

According to the second aspect of the present invention, since the active material layers have the different particle diameters, usage rate of the positive electrode active material in the layer thickness direction can be adjusted. Moreover, reduction of the energy density can be prevented by setting the thickness of each active material layer at a range of 20 to 30 μm. Therefore, the power density can be increased without reducing the energy density.

Still further, a third aspect of the present invention provides a vehicle which comprises the above rechargeable lithium ion battery which has the first aspect or the second aspect.

DETAILED DESCRIPTION OF THE INVENTION

The rechargeable lithium ion battery according to embodiments of the present invention is a chargeable-dischargeable battery comprising a positive electrode and a negative electrode, which can be reversibly intercalated with lithium ion, and non-aqueous electrolyte exhibiting lithium ion conduction. The positive electrode and the negative electrode are separated by a separator to prevent them from contacting directly with each other to make a short circuit.

Figure 1:
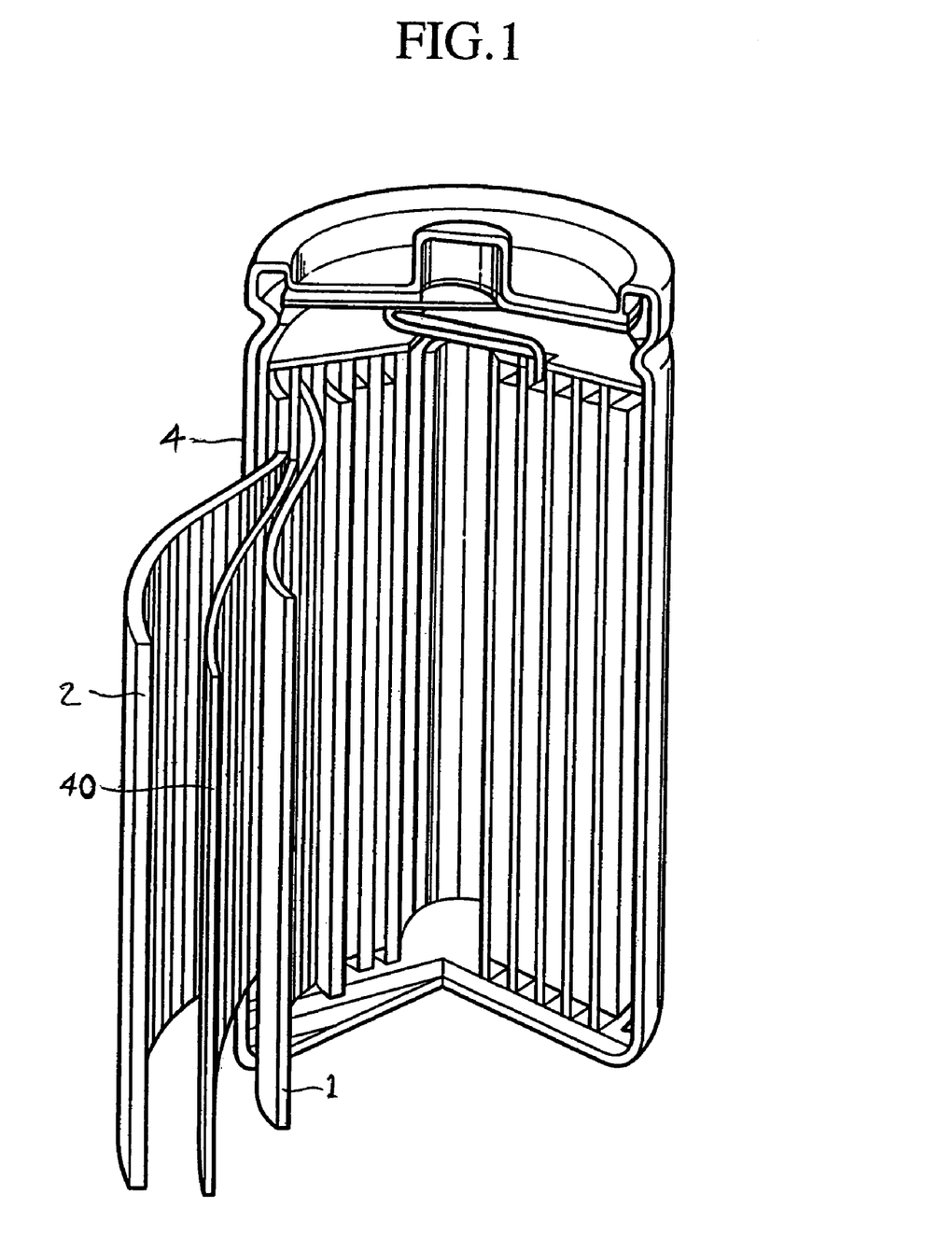
FIG. 1 is a perspective view showing a structure example of a rechargeable lithium ion battery according to embodiments of the present invention.

FIG. 1 shows a structure example of the rechargeable lithium ion battery called jelly roll type. As shown in FIG. 1, a wound device in a roll fashion, which includes a positive electrode 1 with a positive electrode active material coated on both surfaces of a metal foil collector (i.e. a collecting electrode), a negative electrode 2 with a negative electrode material coated on both surfaces of a metal foil collector similarly, and a separator 40 interposed between the both electrodes, is accommodated in a cylindrical sealing case 4. An electrolyte (electrolytic solution) is filled between the positive electrode 1 and the negative electrode 2.

Other than the jelly roll type as shown in FIG. 1, there exists a structure in which the positive electrode, the separator and the negative electrode, which are shaped in sheets, are layered in order, as the rechargeable lithium ion battery.

As the positive electrode active material, lithium metal oxide, various types of widely known positive electrode active materials such as complex oxide in which a part of the lithium metal oxide is substituted with other elements and manganese oxide can be used appropriately. Specifically, as the lithium metal oxide, $LiCoO_2$, $LiNiO_2$, $LiMnO_2$, $LiMn_2O_4$, $Li_xFeO_Y$, $Li_xV_YO_2$ and the like are listed. As the complex oxide in which a part of the lithium metal oxide is substituted with other elements, $Li_xCo_YM_2O_2$ (M is Mn, Ni, V or the like), $Li_xMn_YM_2O_2$ (M is Li, Ni, Cr, Fe, Co or the like) and the like are listed. As the manganese oxide, $\lambda\text{-}MnO_2$, composite of $MnO_2$ and $V_2O_5$, $MnO_{2\text{-}X}V_2O_5$ ($0<_X\leq0.3$) as aq ternary complex oxide, and the like are listed.

As the negative electrode active material, carbon material such as hard carbon, soft carbon, graphite and activated carbon, and metal oxide such as $SnB_xP_YO_2$, $Nb_2O_5$, $LiTi_xO_Y$, $LiFe_xN_Y$ and $LiMn_xN_Y$ can be used singly or in a mixed state. Herein, the hard carbon means the carbon material that is not graphitized when heat treatment is performed at 3000° C. The soft carbon means the carbon material that is graphitized when heat treatment is performed at a range of 2800° C. to 3000° C. Note that various well known technologies can be used for manufacturing the hard carbon, such as a method using furan resin, an organic material in which oxygen is bridged to petroleum pitch having an H/C atomic ratio at a range of 0.6 to 0.8 inclusively as a starting substance. And, for manufacturing the soft carbon, a method using coal, high polymer (polyvinyl chloride resin, polyvinyl acetate, polyvinyl butylate or the like), pitch or the like as the starting material can be used.

As a method for fabricating the positive electrode by forming the active material layer on the collector, for example, a method of manufacturing the positive electrode is used, in which the positive electrode active material is mixed with a binder in a solvent to be in a paste state, and the paste is coated on the positive electrode collector, and dried.

In addition, as a method for fabricating the negative electrode by forming the negative electrode active material layer on the negative electrode collector, a method in which the negative active material is mixed with a binder in a solvent to be in a paste state, and the paste is coated on the negative electrode collector, and dried, can be used. The paste is normally coated on the both sides of the collector. Note that a conductive substance such as carbon black, graphite and acetylene black may be added to the paste. It is preferable that the mixing ratio of the active material and the binder is appropriately determined for the shape of the electrode.

As the collector, various materials used in the rechargeable lithium ion battery can be used. Specifically, an aluminum foil and a copper foil are listed as the positive electrode collector and the negative electrode collector respectively.

Polyvinylidene fluoride (PVDF), polytetrafluoroethylene and the like can be listed as the binder, and various kinds of a polar solvent can be used as the solvent. Specifically, dimethylformamide, dimethylacetamide, methylformamide, N-methylpyrrolidone (NMP) and the like can be listed. Note that N-methylpyrrolidone is preferably used when polyvinylidene fluoride is used as the binder.

As the non-aqueous electrolytic solution, various kinds of solvent exhibiting lithium ion conduction are preferable, where cyclic ester carbonate such as ethylene carbonate (EC), propylene carbonate (PC) and butylene carbonate (BC) can be used singly or by appropriately mixing them. Moreover, to increase the electric conductivity and to obtain the electrolytic solution having an appropriate viscosity, dimethyl carbonate (DMC), diethyl carbonate (DEC), γ-butyrolactone, γ-valerolactone, ethyl acetate, methyl propionate and the like can be used in combination.

$LiPF_6$, $LiBF_4$, $LiClO_4$, $LiAsF_6$, $LiCF_3SO_4$ and the like can be listed as the electrolyte in the non-aqueous electrolytic solution.

A micro porous film of polyolefin based resin such as polyethylene and polypropylene can be used as the separator.

The rechargeable lithium ion battery according to this embodiment can be manufactured by appropriately combining the above-described positive electrode, negative electrode, non-aqueous electrolytic solution and separator. In addition, various kinds of substance and shape can be applied for the battery canister, the battery shape and the like.

Next, a first feature of the rechargeable lithium ion battery according to this embodiment will be explained.

Figure 2:
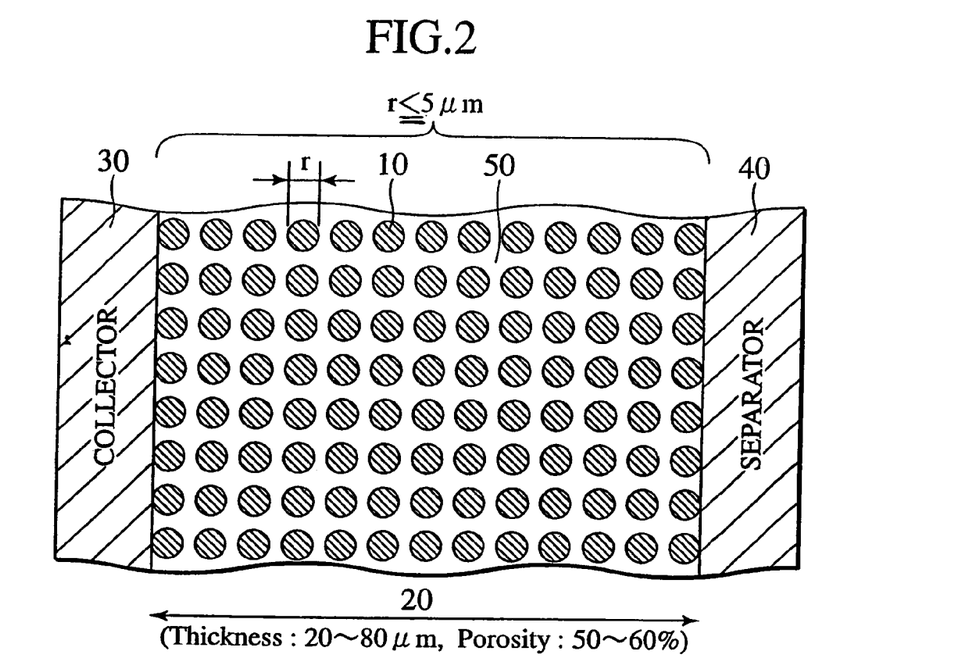
FIG. 2 is a schematic sectional view showing a structure example of an active material layer in a positive electrode according to the embodiments of the present invention, which shows the active material layer where the porosity and the thickness are defined.

As shown in FIG. 2, the rechargeable lithium ion battery according to this embodiment has a positive electrode comprising a collector 30 (i.e. a collecting electrode) and an active material layer 20 formed on the collector 30. The active material layer 20 contains positive electrode active material 10. The particle diameter of the positive electrode active material 10 is set to 5 µm or less, and more preferably to 1 µm or less, and the thickness of the active material layer 20 is set to a range of 20 to 80 µm, and more preferably to at a range of 20 to 30 µm.

For example, the active material layer 20 is obtained by mixing various kinds of components such as the positive electrode active material 10 and the binder in the solvent to make paste, coating the paste on the surface of the collector 30 and drying the coated paste. When the active material layers are formed on the both sides of the collector 30 according to a normal method, each of the active material layers is made to be an independent active material layer. Further, the particle diameter of the positive electrode active material 10 means an average particle diameter.

Moreover, in the rechargeable lithium ion battery the surface of the active material layer 20 substantially contacts a separator 40, and void portions in the active material layer are filled with electrolytic solution 50. The positive electrode and the negative electrode are reversibly intercalated with lithium ions. At the time of discharging the rechargeable lithium ion battery lithium ions migrate (i.e. move) to the positive electrode via the electrolytic solution from the negative electrode.

If the particle diameter of the positive electrode active material 10 is large, lithium ion diffusion in the positive electrode active material 10 particle is in a rate-determining step (i.e. controls the rate of reaction) at the time of discharging a large current rather than the migration of lithium ion in the electrolytic solution 50 in the electrode in the layer thickness direction of the active material layer, which is a cause for the power density reduction. Accordingly, it is preferable that the particle diameter of the positive electrode active material 10 is 5 µm or less. Although the lowest limit value of the particle diameter of the positive electrode active material 10 is not particularly limited, 0.1 µm or more is appropriate practically. In addition, if the thickness of the active material layer 20 is smaller than 20 µm, the power density becomes small due to shortage of the positive electrode active material amount, which is not preferable. On the other hand, if the thickness exceeds 80 µm, internal resistance is increased and the power density becomes small, which is also not preferable.

Under the condition that the particle diameter of the positive electrode active material 10 is small such that the particle diameter of the positive electrode active material 10 is 5 µm or less, the migration of lithium ion in the electrolytic solution 50 in the electrode in the layer thickness direction is considered to be in the rate-determining step at the time of discharging the large current. Accordingly, if the porosity of the active material layer 20 becomes large, the electrolytic solution amount in the electrode increases and the migration power of lithium ion in the electrolytic solution in the electrode in the layer thickness direction increases. Thus, the power density is further increased. However, if the porosity of the active material layer 20 is less than 50%, the electrolytic solution amount cannot be secured in accordance with the amount of the positive electrode active material 10. Thus the resistance increases to reduce the power density. Therefore, the porosity of the active material layer 20 is preferably 50% or more. In addition, if the porosity exceeds 60%, shortage of the amount of the positive electrode active material 10, that is, reduction of a positive electrode surface area makes the power density gradually reduced. Accordingly, the porosity is more preferably at a range of 50 to 60%.

On the contrary, under the condition that the particle diameter of the positive electrode active material 10 is larger than 5 µm, the lithium ion diffusion in the positive electrode active material 10 is in the rate-determining step. Therefore, the power density cannot be increased even if the porosity is raised to increase the amount of the electrolytic solution 50 in the electrode. The power density is rather decreased because the amount of the positive electrode active material 10 is reduced.

As described above, the thickness of the active material layer 20 is preferably 20 µm or more to increase the power density by defining the porosity of the active material layer 20. This is because the influence of the lithium ion migration in the electrolytic solution 50 in the electrode in the layer thickness direction and the porosity is small when the layer thickness is thin.

Figure 3:
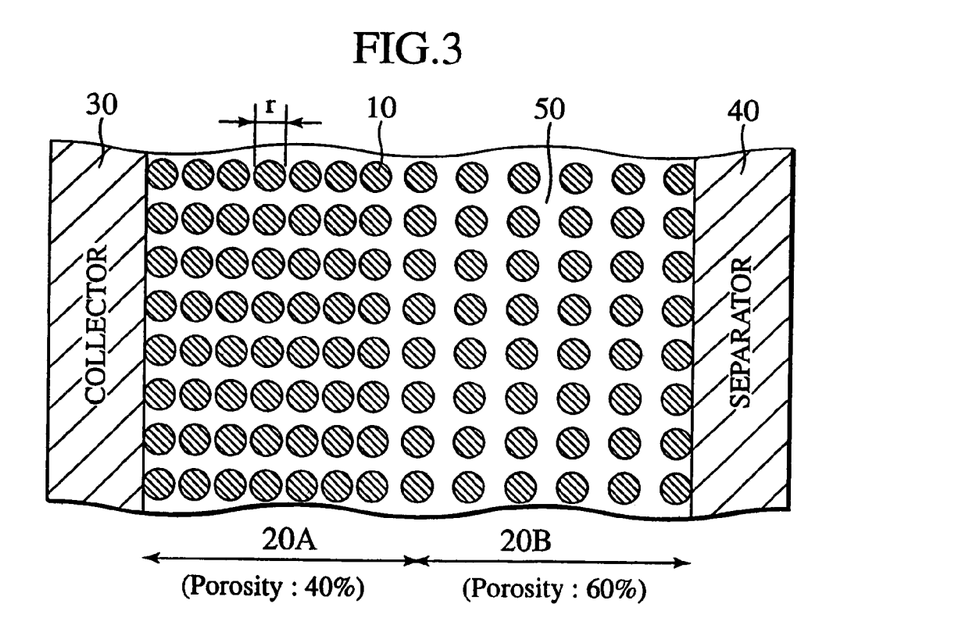
FIG. 3 is a schematic sectional view showing a structure example of an active material layer in a positive electrode according to the embodiments of the present invention, which shows the active material layer having two layers of the different porosities.

The active material layer 20 may have a structure where a plurality of active material layers having their mean porosities positively changed to be different from other are layered. For example, as shown in FIG. 3, the active material layer may have a two layer structure having active material layers 20A and 20B, each of which has a different porosity. In this case, the power density can be increased without sacrificing the energy density. Specifically, it is preferable that the porosity of the active material layer 20B closer to the separator is made larger and the porosity of the active material layer 20A closer to the collector is made smaller. The amount of the electrolytic solution 50 in the vicinity of the separator 40 can be increased and the migration power of lithium ion can be increased by making the porosity of the active material layer 2GB adjacent to the separator 40 large.

Moreover, a usage rate of the positive electrode active material 10 in the vicinity of the collector 30 can be increased by making the porosity in the vicinity of the collector 30 small. Considering the above characteristics, the power density can be effectively increased by balancing the diffusion in the positive electrode active material 10 and the migration in the electrolytic solution 50. Since the energy density is influenced by an average of respective mean porosities of layers 20A and 20B and the active material amount of the active material layer 20, the power density can be increased without sacrificing the energy density by appropriately adjusting the average porosity and the amount of the active material. For example, an electrode having the single active material layer of the porosity of 50% and the thickness of 60 µm, as in FIG. 2, and an electrode that consists of a layered active material layer, which has a first active material layer of the porosity of 40% and the thickness of 30 µm closer to the collector and a second active material layer of the porosity of 60% and the thickness of 30 µm closer to the separator, as in FIG. 3, have the equal energy density. This is because the average porosities and the amounts of the active material of the two electrodes are equal.

As shown in FIG. 3, in the case where the electrode includes two active material layers 20A and 20B having the different porosities, the thickness of the active material layers 20A and 20B is preferably at a range of 20 to 30 µm, and more preferably at a range of 20 to 25 µm. The thickness may be different between the active material layers 20A and 20B. This is because the energy density tends to become small if the thickness of each of the active material layers 20A and 20B is more than 30 µm, and the usage rate of the active material layer 20A closer to the collector 30 increases if less than 30 µm. The porosity of the active material layer 20A closer to the collector 30 is preferably 30% or more and less than 50%, and more preferably 40% or more and less than 50%. The porosity of the active material layer 20B closer to the separator is preferably at a range of 50% to 60%, and more preferably at a range of 50% to 55%. More effect can be obtained by adjusting the porosity within the above ranges.

Next, a second feature of the rechargeable lithium ion battery according to this embodiment of the present invention will be explained.

Figure 4:
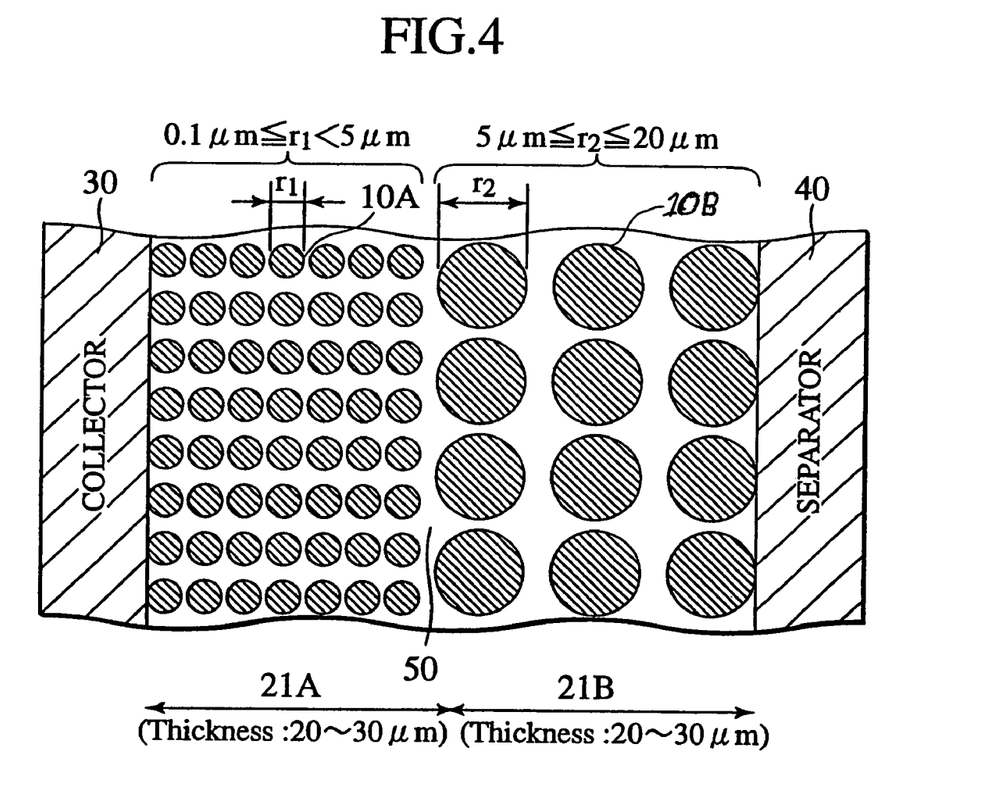
FIG. 4 is a schematic sectional view showing a structure example of an active material layer in a positive electrode according to the embodiments of the present invention, which shows the active material layer having two layers where the particle diameters of the positive electrode active materials are different.

As shown in FIG. 4, the rechargeable lithium ion battery according to this embodiment comprises active material layers 21A and 21B respectively containing positive electrode active materials 10A and 10B with the different particle diameters in the positive electrode. The power density can be increased by this constitution.

Generally, the migration of lithium ion in the electrolytic solution in the electrode in the layer thickness direction of the active material layer tends to be in the rate-determining step at the time of discharging the large current. Accordingly, sufficient lithium ion does not reach the vicinity of the collector, the positive electrode active material cannot be utilized effectively, and thus the power density tends to be reduced.

To solve this problem it is preferable that the particle diameter of the positive electrode active material near the separator 40 is made to be larger. Accordingly, the electrode surface area near the separator 40 is reduced, the usage rate of the positive electrode active material near the separator 40 is reduced, and thus lithium ion can migrate more easily to the vicinity of the collector 30. As a result, the usage rate of the positive electrode active material near the collector 30 increases, and the usage rate of the electrode active material is totally increased, thus increasing the power density. The amount of the positive electrode active material is appropriately adjusted such that the total amounts in the active material layer of the single layer structure and in the active material layer of the two layer structure become equal, and thus the power density can be increased without sacrificing the energy density.

The advantage from adopting the active material layer of the two layer structure exhibits when the particle diameter of the positive electrode active material 10B near the separator 40 is so large that the usage rate of the positive electrode active material near the separator 40 is reduced. Therefore, if the thickness of the active material layer 21B closer to the separator 40 is thicker than required, the usage rate of the positive electrode active material 10B near the separator 40 is increased. Thus, the advantage of the two layer structure becomes small, which is not preferable. The power density is also reduced if the thickness of the active material layer 21A closer to the collector 30 is thicker than required, which is not preferable. Therefore, the thickness of each layer is preferably 30 µm or less, and more preferably 25 µm or less. The lowest limit value of the thickness of each active material layer is preferably 20 µm in order to prevent reduction of the energy density. This is because the weight ratio of the collector and the like in the battery becomes large if the thickness of the active material layer is less than 20 µm.

Moreover, if the particle diameter of the active material layer 21A closer to the collector 30 is 5 µm or more, or if the active material particle diameter of the active material layer 21B closer to the separator 40 is less than 5 µm, the effect of increasing the power density becomes small, which is not preferable. The lowest limit value of particle diameter r1 of the positive electrode active material 10A closer to the collector 30 is not particularly limited. But, it is practically appropriate that the value is 0.1 µm or more. It is preferable that the upper limit of the particle diameter r2 of the positive electrode active material 10B of the active material layer 20B closer to the separator 40 is appropriately selected in a range where the active material particle diameter does not become larger than the thickness of the active material layer. From the above viewpoint, the particle diameter of the positive electrode active material 10A of the active material layer 21A closer to the collector 30 is preferably 0.1 µm or more and less than 5 µm, and more preferably 1 µm or more and less than 5 µm. The particle diameter of the positive electrode active material of the active material layer 21B closer to the separator 40 is preferably at a range of 5 µm to 20 µm inclusively, and more preferably at a range of 5 µm to 10 µm.

Note that the particle diameter of the positive electrode active material can be adjusted by the particle diameter of the starting material or classification thereof, and the porosity of the active material layer can be adjusted by changing pressure when pressing the layer after the paste containing the positive electrode active material and the conductive material is coated on the collector and dried.

In the above description, the two layer structure is mainly explained, however, the similar effect can be obtained by adjusting the porosity of the active material layer, the particle diameter of the active material and the thickness of the active material layer even if the layer structure has a multi-layer structure of three layers or more.

In the case of adopting the multi-layer structure, coating can be sequentially formed to n-th layer by a method in which a first layer is coated on the collector and a second layer is coated thereon. Alternatively, the multi-layer structure also can be formed by utilizing the difference of the sedimentation velocity of the particles of the different sizes.

In the rechargeable lithium ion battery of this embodiment described above, it is preferable that the positive electrode active material is lithium manganese oxide from the viewpoint of obtaining a high power density. Since manganese is much more inexpensive than cobalt and nickel and abundant as resource, it is also preferable from the viewpoint of a manufacturing cost. Specific examples of the lithium manganese oxide, $LiMnO_2$ and $LiMn_2O_4$ are listed.

In order to increase the power density in the rechargeable lithium ion battery of this embodiment, the electrolyte concentration of the non-aqueous electrolytic solution is preferably at a range of 1.0 to 3.0 mol/l, and more preferably at a range of 1.5 to 2.5 mol/l. By using the electrolytic concentration in the above ranges, the diffusion in the active material and the migration in the electrolytic solution are balanced and the preferable power density can be obtained.

When the particle diameter of the positive electrode active material is small, or when the porosity of the active material layer is large, the migration of lithium ion in the electrolytic solution in the electrode in the layer thickness direction is in the rate-determining step at the time of discharging the large current. Accordingly, if the electrolyte concentration is made large, concentration polarization is controlled and the migration power of lithium ion in the electrolytic solution in the electrode in the layer thickness direction increases, thus the power density increases. If the electrolyte concentration exceeds 3.0 mol/l, influence of the lithium ion conductance of the electrolytic solution emerges to reduce the power density, which is not preferable. And, if the electrolyte concentration is less than 1.0 mol/l, the internal resistance of the battery increases, which is also not preferable. A voltage at the time of discharging can be held at a high level and stabilized by adjusting the electrolyte concentration at the range of 1.5 to 2.5 mol/l.

The relation between the particle diameter of the positive electrode active material and the electrolyte concentration could also influence the power density. Specifically, when the particle diameter of the positive electrode active material is larger than 5 μm, lithium ion diffusion in the positive electrode active material particle is in a rate-determining step at the time of discharging the large current rather than the migration of lithium ion in the electrolytic solution in the electrode in the layer thickness direction. Accordingly, the influence of the concentration of the electrolytic solution is small, and the power density does not increase as expected even if the electrolyte concentration is increased. Therefore, when the active material layer is formed in the multi-layer structure of two layers or more, it is preferable that the active material particle diameter of the active material layer closer to the collector is made to be less than 5 μm.

In addition, the electrolyte is preferably $LiPF_6$ or $LiBF_4$ from the viewpoint that the power density is increased by using a compound having high electrical conductivity.

Note that the particle diameter of the positive electrode active material, the porosity and the thickness of the active material layer can be measured by a method measuring various particle distribution such as a screening test and a sedimentation method, a specific gravity of constituent substance, and a micrometer, respectively.

As described above, in the rechargeable lithium ion battery of this embodiment, the high power density can be obtained while maintaining the energy density. Therefore, it can be utilized best as a power source of the electric vehicle and the hybrid vehicle.

EXAMPLES

[Relation Among the Particle Diameter of the Positive Electrode Active Material, the Thickness of the Active Material Layer and the Porosity Thereof, and the Power Density]

Example 1

Lithium manganese oxide ($LiMnO_2$) having the average particle diameter of 3 μm was used as the positive electrode active material. The specific surface area of the positive electrode active material was about 3 $m^2/g$. 75 wt % of the positive electrode active material, 10 wt % of acetylene black as the conductive material and 15 wt % of PVDF as the binder were mixed in NMP and coated on the aluminum foil (collector). Thus, a plurality of positive electrodes having the different porosities of the active material layers in the thickness of the active material layer of 60 μm were fabricated. The porosity was adjusted by the amount of the solvent, drying conditions and the pressing of the electrode. Metal lithium was used for the negative electrode active material, and a mixture of PC and DMC (volume ratio 1:1), in which 1M of $LiPF_6$ was dissolved, was used as the electrolytic solution. Thus, a plurality of the rechargeable lithium batteries having the different porosities of the active material layers were fabricated.

Comparative Example 1

A plurality of the rechargeable lithium batteries having the different porosities were fabricated by using the same conditions as those of Example 1 except that the average particle diameter of the positive electrode active material is 30 μm.

Comparative Example 2

A plurality of the rechargeable lithium batteries having the different porosities were fabricated by using the same conditions as those of Example 1 except that the thickness of the active material layer is 10 μm.

Figure 5:
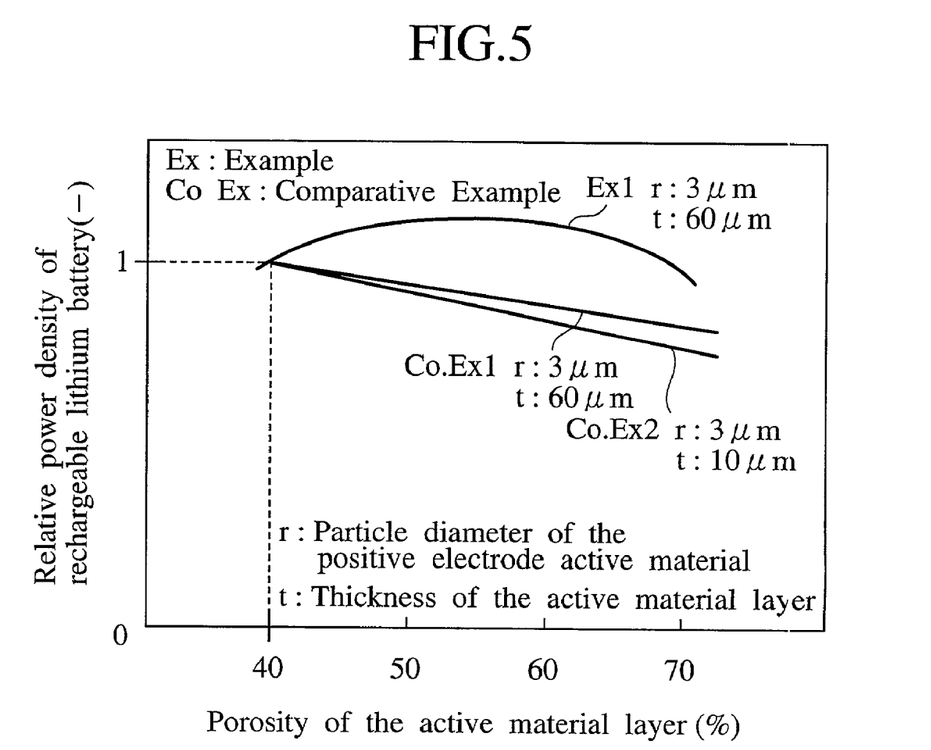
FIG. 5 is a graph showing the relation between the thickness of the active material layer (in the positive electrode) and the power density of the rechargeable lithium ion battery in each of example 1, comparative example 1 and comparative example 2.

FIG. 5 shows the relation between the porosity of the active material layer and the power density (a relative value when setting the power density at 40% of the porosity as 1) of the rechargeable lithium ion battery in each of Example 1, Comparative example 1 and Comparative example 2. The power density of the battery of Example 1 reached the maximum value at a range of 50 to 60% of the porosity, while the power density of the batteries of Comparative examples 1 and 2 are reduced as the porosities became larger.

[Effects of the Active Material Layer Structure Having Two Layers with Different Porosities]

Example 2

The lithium manganese oxide ($LiMnO_2$) having the average particle diameter of 3 μm was used as the positive electrode active material. The specific surface area of the positive electrode active material was about 3 $m^2/g$. 75 wt % of the positive electrode active material, 10 wt % of acetylene black as the conductive material and 15 wt % of PVDF as the binder were mixed in NMP and coated on the aluminum foil (collector). Thus, a first active material layer having the porosity of 40% and the thickness of 30 μm was formed. Moreover, a second active material layer having the porosity of 60% and the thickness of 30 μm in the same composition was layered on the first active material layer. The porosity was adjusted by the amount of the solvent, the drying conditions and the pressing of the electrode. The rechargeable lithium ion battery was fabricated by using the positive electrode having the two active material layers of the different porosities, which were fabricated as described above, the negative electrode containing the negative electrode active material, which consists of the metal lithium, and the electrolytic solution that consists of the mixture of PC and DMC (volume ratio 1:1) dissolving 1M of $LiPF_6$ therein.

Example 3

The lithium manganese oxide ($LiMnO_2$) having the average particle diameter of 3 μm was used as the positive electrode active material. The specific surface area of the positive electrode active material was about 3 $m^2/g$. 75 wt % of the positive electrode active material, 10 wt % of acetylene black as the conductive material and 15 wt % of PVDF as the binder were mixed in NMP and coated on the aluminum foil (collector). Thus, the positive electrode having the 50% porosity of the active material layer and the 60 μm thickness of the active material layer was fabricated. The porosity was adjusted by the amount of the solvent, the drying conditions and the pressing of the electrode. The rechargeable lithium ion battery was fabricated by using the positive electrode fabricated as described above, the negative electrode active material that consists of the metal lithium, and the electrolytic solution that consists of the mixture of PC and DMC (volume ratio 1:1) dissolving 1M of $LiPF_6$ therein.

Example 4

The lithium manganese oxide ($LiMnO_2$) having the average particle diameter of 3 μm was used as the positive electrode active material. The specific surface area of the positive electrode active material was about 3 $m^2/g$. 75 wt % of the positive electrode active material, 10 wt % of acetylene black as the conductive substance and 15 wt % of PVDF as the binder were mixed in NMP and coated on the aluminum foil (collector). Thus, the first active material layer having the porosity of 40% and the thickness of 20 μm was formed. Moreover, the second active material layer having the porosity of 60% and the thickness of 40 μm in the same composition was layered on the first active material layer. The porosity was adjusted by the amount of the solvent, the drying conditions and the pressing of the electrode. Thus, the positive electrode having the active material layer of the two layer structure with the total thickness of 60 μm was fabricated. The rechargeable lithium ion battery was fabricated by using this positive electrode, the negative electrode using the negative electrode active material that consists of the metal lithium, and the electrolytic solution that consists of the mixture of PC and DMC (volume ratio 1:1) dissolving 1M of $LiPF_6$ therein.

Figure 6:
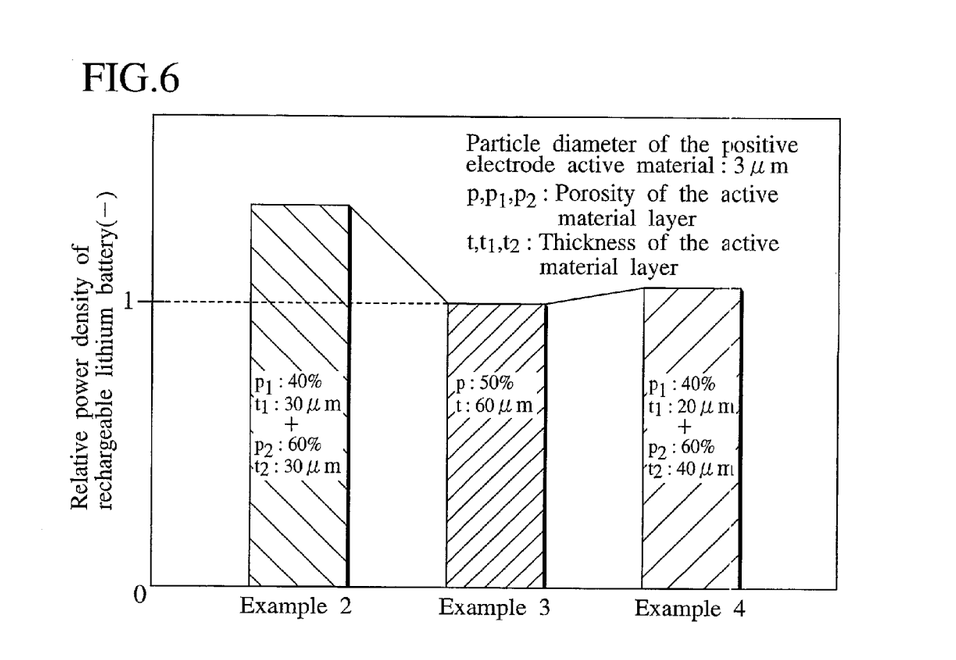
FIG. 6 is a graph showing the relation between the layer structure of the active material layer and the power density of the rechargeable lithium ion battery in each of example 2, example 3 and example 4.

FIG. 6 shows the power density (a relative value when setting the power density of Example 3 as 1) of the battery in each of Examples 2 to 4. The power density increased by allowing the active material layer to have the two layer structure. In addition, in the case of the two layer structure, the power density could be increased more effectively when the thickness of each active material layer is set at 30 μm or less.

Figure 7:
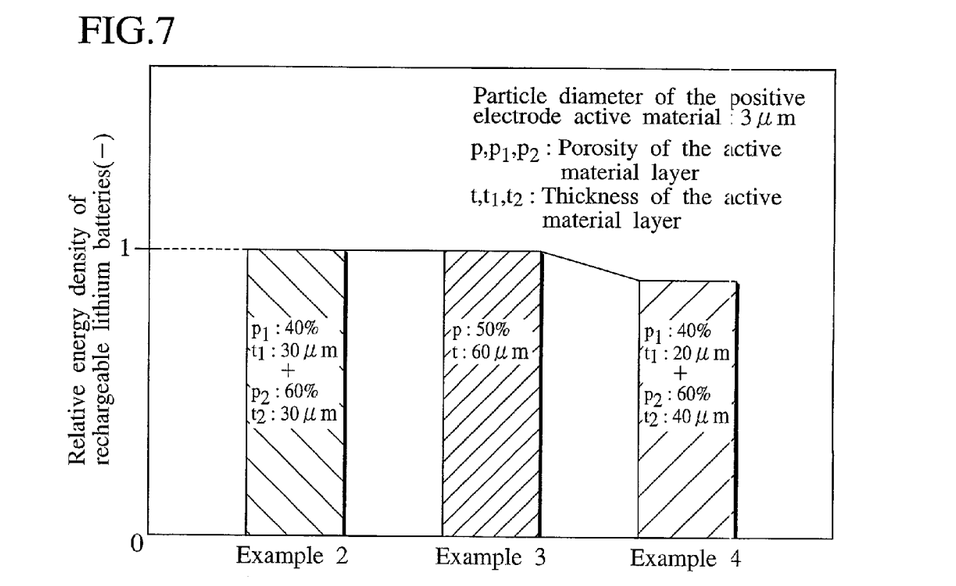
FIG. 7 is a graph showing the relation between the layer structure of the active material layer and the energy density of the rechargeable lithium ion battery in each of example 2, example 3 and example 4.

Next, FIG. 7 shows the energy density (a relative value when setting the energy density of Example 3 as 1) of the battery in each of Examples 2 to 4. The energy densities of Examples 2 and 3 were equal. This is because the average porosities of Examples 2 and 3, and the amounts of the positive electrode active material of Examples 2 and 3 are equal severally. Although the power density of Example 4 increased in comparison with Example 3 having the active material layer of the single layer structure, the energy density was smaller.

[Effects of the Active Material Layer Structure Having Two Layers with Different Particle Diameters of the Positive Electrode Active Material]

Example 5

Two kinds of the lithium manganese oxide ($LiMnO_2$) having the average particle diameter of 3 μm and 9 μm were used as the positive electrode active material. 75 wt % of the positive electrode active material with the average particle diameter of 3 μm, 10 wt % of acetylene black as the conductive substance and 15 wt % of PVDF as the binder were mixed in NMP and coated on the aluminum foil (collector). Thus, the first active material layer having the thickness of 30 μm was fabricated. The second active material layer having the thickness of 30 μm, which was fabricated in the same method by using the positive electrode active material having the average particle diameter of 9 μm, was layered on the first active material layer. The positive electrode having the active material layer of the two layer structure with the thickness of 60 μm was thus fabricated. The rechargeable lithium ion battery was fabricated by using this positive electrode, the negative electrode containing the negative electrode active material that consists of the metal lithium, and the electrolytic solution that consists of the mixture of PC and DMC (volume ratio 1:1) dissolving 1M of $LiPF_6$ therein.

Example 6

The positive electrode having the active material layer of the single layer structure with the thickness of 50 μm was fabricated in the same method as that of Example 5 by using the lithium manganese oxide ($LiMnO_2$) having the average particle diameter of 3 μm as the positive electrode active material. The rechargeable lithium ion battery was fabricated by using the positive electrode, the negative electrode containing the negative electrode active material, which consists of the metal lithium, and the electrolytic solution that consists of the mixture of PC and DMC (volume ratio 1:1) dissolving 1M of $LiPF_6$ therein.

Figure 8:
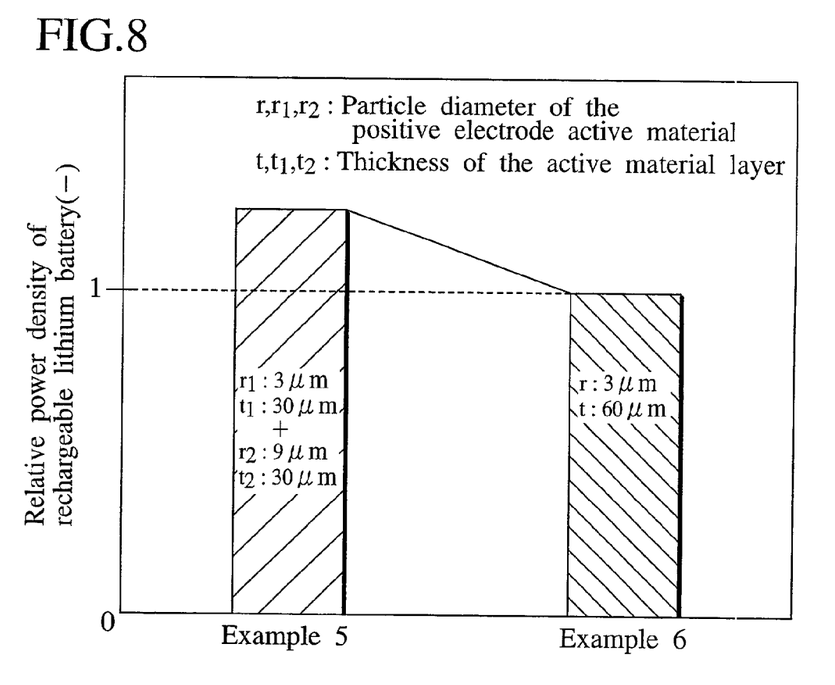
FIG. 8 is a graph showing the relation between the layer structure of the active material layer and the power density of the rechargeable lithium ion battery in each of example 5 and example 6.
Figure 9:
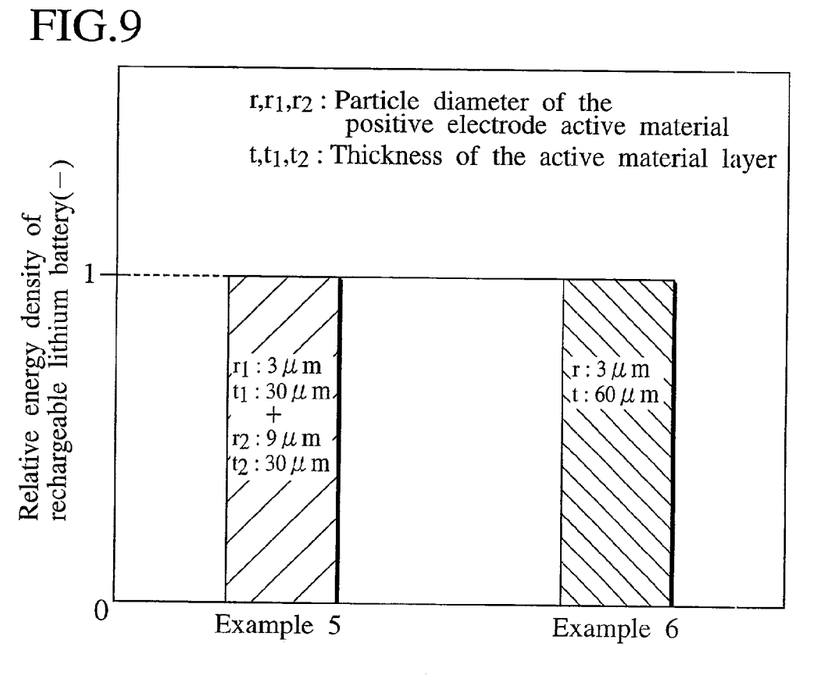
FIG. 9 is a graph showing the relation between the layer structure of the active material layer and the energy density of the rechargeable lithium ion battery in each of example 5 and example 6.

FIG. 8 shows the power density (a relative value when setting the power density of Example 6 as 1) in each of Examples 5 and 6. Example 5 having the active material layer of the two layer structure in which each layer has the different particle diameter shows the higher power density. In addition, FIG. 9 shows the energy density (a relative value when setting the energy density of Example 6 as 1) in each of Examples 5 and 6. The energy densities of Examples 5 and 6 were equal. This is because the amounts of the positive electrode active material of Examples 5 and 6 are equal.

[Effects of the Thicknesses of the Two Active Material Layers with Different Particle Diameters of the Positive Electrode Active Material]

Comparative Example 3

Two kinds of the lithium manganese oxide (LiMnO$_2$) having the average particle diameters of 3 μm and 9 μm were used as the positive electrode active material. 75 wt % of the positive electrode active material with the average particle diameter of 3 μm, 10 wt % of acetylene black as the conductive substance and 15 wt % of PVDF as the binder were mixed in NMP and coated on the aluminum foil (collector). Thus, the first active material layer having the thickness of 20 μm was fabricated. The second active material layer having the thickness of 40 μm, which was fabricated in the same method by using the positive electrode active material having the average particle diameter of 9 μm, was layered on the first active material layer. The positive electrode having the active material layer of the two layer structure with the thickness of 60 μm was thus fabricated.

The rechargeable lithium ion battery was fabricated by using the positive electrode, the negative electrode containing the negative electrode active material that consists of the metal lithium, and the electrolytic solution that consists of the mixture of PC and DMC (volume ratio 1:1) dissolving 1M of LiPF$_6$ therein.

Figure 10:
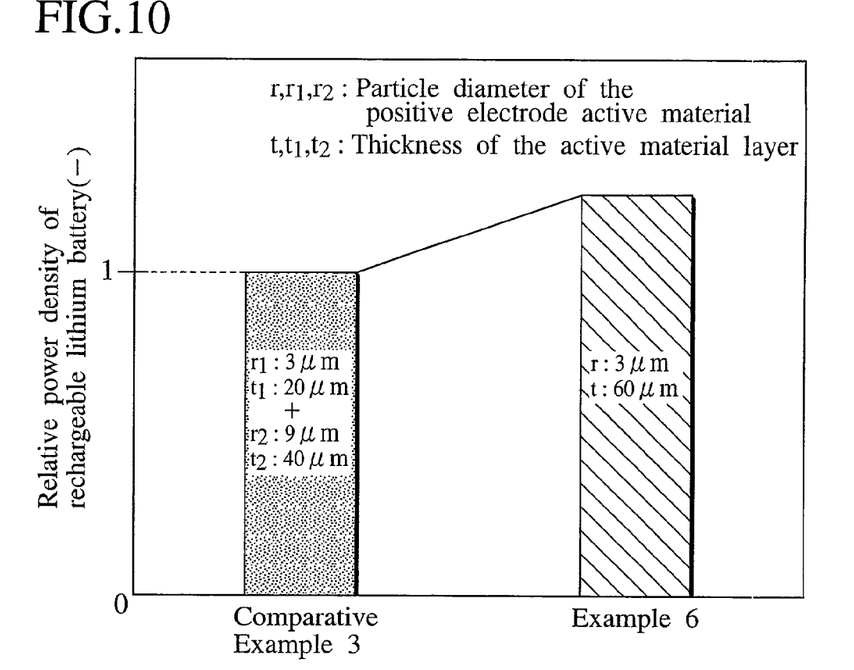
FIG. 10 is a graph showing the relation between the layer structure of the active material layer in the positive electrode and the power density of the rechargeable lithium ion battery in each of comparative example 3 and example 6.
Figure 11:
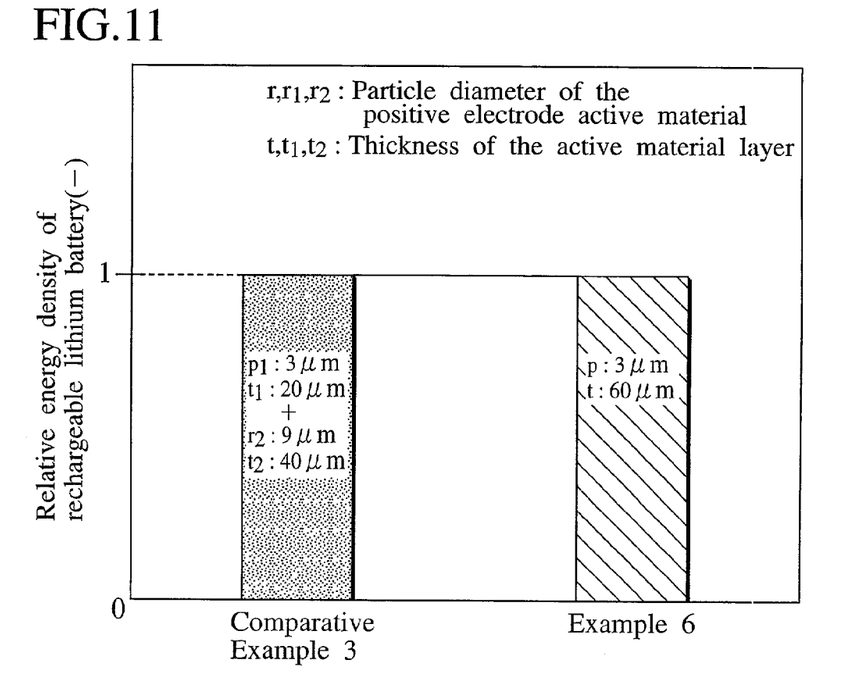
FIG. 11 is a graph showing the relation between the layer structure of the active material layer and the energy density of the rechargeable lithium ion battery in each of comparative example 3 and example 6.

FIG. 10 shows the power density (a relative value when setting the power density of Comparative example 3 as 1) in each of Comparative example 3 and Example 6. The power density of Comparative example 3 is low because the usage rate of the active material near the separator is reduced due to the large particle diameter of the positive electrode active material closer to the separator and the usage rate of the positive electrode active material near the collector was also reduced since the thickness of the active material layer closer to the separator was thick. In addition, FIG. 11 shows the energy density (a relative value when setting the energy density of Comparative example 3 as 1) in each of Comparative example 3 and Example 6. The specific energies of Comparative example 3 and Example 6 were equal. This is because the amounts of the positive electrode active material of Comparative example 3 and Example 6 are equal.

[Influence of the Particle Diameter of the Positive Electrode Active Material and the Electrolyte Concentration to the Power Density]

Example 7

The lithium manganese oxide (LiMnO$_2$) having the average particle diameter of 3 μm was used as the positive electrode active material. 75% by weight of the positive electrode active material with the average particle diameter of 3 μm, 10% by weight of acetylene black as the conductive substance and 15% by weight of PVDF as the binder were mixed in NMP and coated on the aluminum foil (collector). Thus, the positive electrode having the active material layer with the thickness of 30 μm was fabricated. A plurality of the rechargeable lithium batteries were fabricated by using this positive electrode, the negative electrode containing the negative electrode active material, which consists of the metal lithium, and the electrolytic solution that consists of the mixture of PC and DMC (volume ratio 1:1) dissolving LiPF$_6$ with the different concentrations therein.

Comparative Example 4

A plurality of the rechargeable lithium batteries were fabricated by using the same conditions as those of Example 7 except that the lithium manganese oxide (LiMnO$_2$) with the average particle diameter of 30 μm was used as the positive electrode active material.

Figure 12:
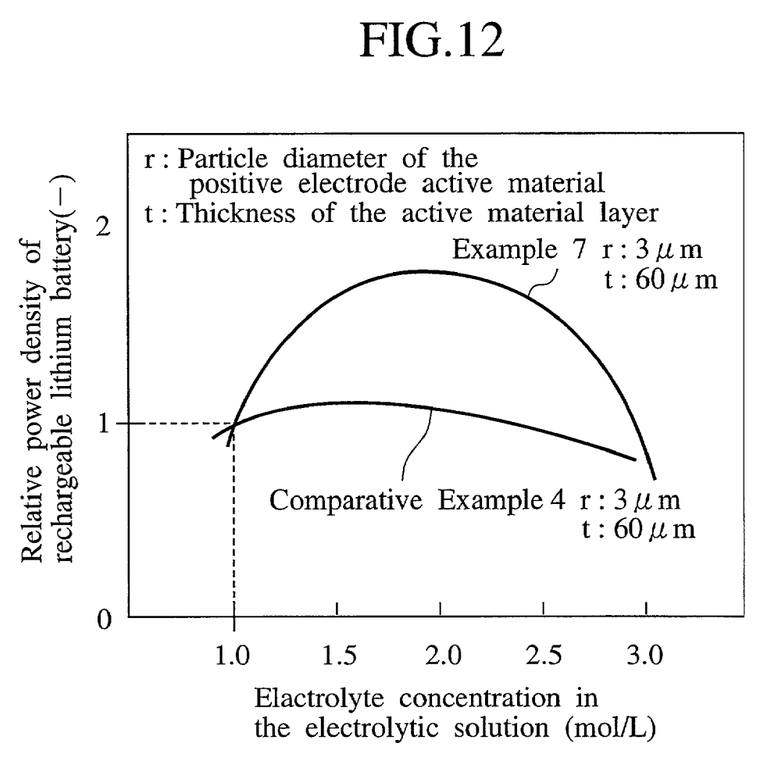
FIG. 12 is a graph showing the relation between the particle diameter of the positive electrode active material and the power density of the rechargeable lithium ion battery in each of example 7 and comparative example 4.

FIG. 12 shows the relation between the electrolyte concentration and the power density (a relative value when setting the power density at the time of 1 mol/l of the electrolyte concentration as 1) in each of Example 7 and Comparative example 4. Example 7 had the maximum power density when the electrolyte concentration was 2 mol/l. On the contrary, Comparative example 4 did not show the power density increase even after the electrolyte concentration was increased.

[Influence of the Thickness of the Active Material Layer and the Electrolyte Concentration to the Power Density]

Example 8

The lithium manganese oxide (LiMnO$_2$) having the average particle diameter of 3 μm was used as the positive electrode active material. 75 wt % of the positive electrode active material, 10 wt % of acetylene black as the conductive substance and 15 wt % of PVDF as the binder were mixed in NMP and coated on the aluminum foil (collector). Thus, a plurality of the positive electrodes having the active material layers with the different thicknesses were fabricated. A plurality of the rechargeable lithium batteries were fabricated by using these positive electrodes, the negative electrode containing the negative electrode active material, which consists of the metal lithium, and the electrolytic solution that consists of the mixture of PC and DMC (volume ratio 1:1) dissolving LiBF$_4$ with the concentration of 2 mol/l therein.

Example 9

The rechargeable lithium ion battery was fabricated by using the same method as that of Example 8 except that LiBF$_4$ with the concentration of 1 mol/l was used as the electrolytic solution.

Figure 13:
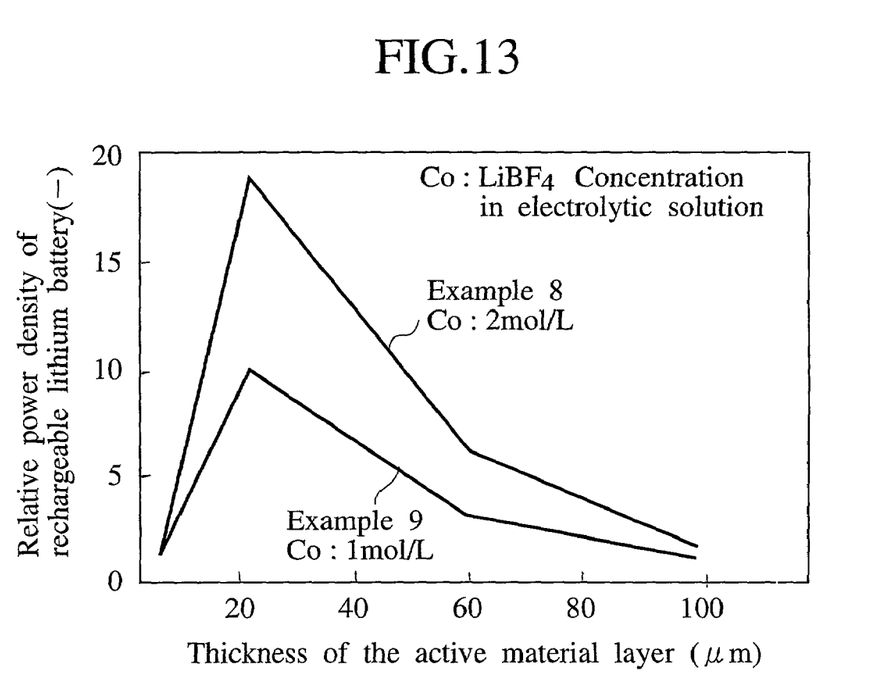
FIG. 13 is a graph showing the relation between the thickness of the active material layer and the power density of the rechargeable lithium ion battery in each of example 8 and example 9.

FIG. 13 shows the relation between the thickness of the active material layer and the power density (a relative value when setting the power density at the time of 100 μm in the layer thickness of Example 9 as 1) of Examples 8 and 9. As shown in FIG. 13, when the thickness of the active material layer is 20–80 μm, preferably 20–60 μm, high power densities are obtained. The power density of Example 8 having the preferable electrolyte and the electrolyte concentration was twice as high as that of Example 9.

The entire contents of Japanese Patent Application P2000-257766 (filed Aug. 28, 2000) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings.

The scope of the inventions is defined with reference to the following claims.

What is claimed is:

1. A rechargeable lithium ion battery, comprising:
   (a) a positive electrode comprising:
      a collecting electrode; and
      an active material layer formed on the collecting electrode, the active material layer containing particles of a positive electrode active material within a prescribed particle size range, the active material layer having a layer thickness within a prescribed layer thickness range, the active material layer comprising a first active material layer having a first porosity within a first porosity range, and a second active material layer having a second porosity within a second porosity range higher than the first porosity range, wherein the first active material layer and the second active material layer contain particles of substantially the same particle size;

(b) a negative electrode; and (c) a non-aqueous electrolytic solution.

2. The rechargeable lithium ion battery as claimed in claim 1, wherein the first porosity range is apart from the second porosity range.

3. The rechargeable lithium ion battery as claimed in claim 1, wherein the first active material layer is closer to the collecting electrode than the second active material layer.

4. The rechargeable lithium ion battery as claimed in claim 1, wherein the active material layer has an average porosity thereof adjusted within a prescribed average porosity range.

5. The rechargeable lithium ion battery as claimed in claim 4, wherein the average porosity range is set within a range of 50% or more.

6. The rechargeable lithium ion battery as claimed in claim 5, wherein the average porosity range is set within a range of 50% to 60%.

7. The rechargeable lithium ion battery as claimed in claim 5, wherein the particle size range is set within a range of 5 µm or less in terms of an average particle diameter.

8. The rechargeable lithium ion battery as claimed in claim 7, wherein the layer thickness range is set within a range of 20 µm to 80 µm.

9. The rechargeable lithium ion battery as claimed in claim 8, wherein the layer thickness range is set within a range of 20 µm to 30 µm.

10. The rechargeable lithium ion battery as claimed in claim 8, wherein the active material layer comprises:

the first active material layer formed with a first thickness on the collecting electrode; and the second active material layer formed with a second thickness on the first active material layer, the first and second thicknesses are each set within a range of 20 µm to 30 µm, the first active material layer has the first porosity within a range of 30% to 50%, and the second active material layer has the second porosity thereof within a range of 50% to 60%.

11. The rechargeable lithium ion battery as claimed in claim 1, wherein the positive electrode active material comprises lithium manganese oxide.

12. The rechargeable lithium ion battery as claimed in claim 1, wherein the non-aqueous electrolytic solution contains a concentration of electrolyte within a range of 1.0 mol/l to 3.0 mol/l.

13. The rechargeable lithium ion battery as claimed in claim 12, wherein the concentration of electrolyte is set within a range of 1.5 mol/l to 2.5 mol/l.

14. The rechargeable lithium ion battery as claimed in claim 1, wherein the non-aqueous electrolytic solution contains an electrolyte comprising one of $LiPF_6$ and $LiBF_4$.

15. The rechargeable lithium ion battery as claimed in claim 1, wherein the first and second active material layers have a thickness thereof within a range of 20 µm to 30 µm.

16. A rechargeable lithium ion battery comprising:

(a) a positive electrode comprising:

a collecting electrode; and an active material layer formed on the collecting electrode, the active material layer containing particles of a positive electrode active material within a prescribed particle size range, the active material layer having a layer thickness within a prescribed layer thickness range, the active material layer having a local porosity thereof changed along a direction of the layer thickness, wherein the active material layer comprises:

a first active material layer formed with a first porosity; and a second active material layer formed with a second porosity changed from the first porosity, wherein the first active material layer is closer to the collecting electrode than the second active material layer, and the first porosity is lower than the second porosity; and wherein the first active material layer and the second active material layer contain particles of substantially the same particle size;

(b) a negative electrode; and (c) a non-aqueous electrolytic solution.

* * * * *